US012612521B2

(12) United States Patent
Rogers et al.

(10) Patent No.: US 12,612,521 B2
(45) Date of Patent: Apr. 28, 2026

(54) CARBON CAPTURE PAINT COMPOSITIONS AND METHODS OF MAKING AND USING THE SAME TO CAPTURE CARBON DIOXIDE FROM AIR

(71) Applicant: The People's CO2 Company, LLC, Kemah, TX (US)

(72) Inventors: Tanya Rogers, Clear Lake Shores, TX (US); Robert Ham, Houston, TX (US); Rawand Rasheed, Houston, TX (US)

(73) Assignee: The People's CO2 Company, LLC, Kemah, TX (US)

( * ) Notice: Subject to any disclaimer, the term of this patent is extended or adjusted under 35 U.S.C. 154(b) by 401 days.

(21) Appl. No.: 18/528,565

(22) Filed: Dec. 4, 2023

(65) Prior Publication Data

US 2024/0209215 A1 Jun. 27, 2024

Related U.S. Application Data

(60) Provisional application No. 63/432,991, filed on Dec. 15, 2022.

(51) Int. Cl.

| | |
|---|---|
| ***C09D 1/04*** | (2006.01) |
| ***B01D 53/14*** | (2006.01) |
| ***C09D 7/40*** | (2018.01) |
| ***C09D 7/41*** | (2018.01) |
| ***C09D 7/61*** | (2018.01) |
| ***C09D 7/65*** | (2018.01) |
| ***C09D 7/80*** | (2018.01) |

(52) U.S. Cl.

CPC ................. *C09D 1/04* (2013.01); *C09D 7/41* (2018.01); *C09D 7/61* (2018.01); *C09D 7/65* (2018.01); *C09D 7/69* (2018.01); *C09D 7/80* (2018.01); *B01D 53/1475* (2013.01); *B01D 2257/504* (2013.01)

(58) Field of Classification Search

CPC ..................... B01D 53/1475; B01D 2257/504; C09D 1/04; C09D 7/41; C09D 7/61; C09D 7/65; C09D 7/69; C09D 7/80

See application file for complete search history.

(56) References Cited

U.S. PATENT DOCUMENTS

| | | | | |
|---|---|---|---|---|
| 9,371,455 | B2 * | 6/2016 | Messersmith | C23C 18/2066 |
| 9,617,433 | B2 * | 4/2017 | Sababi | C23F 11/185 |
| 2021/0163776 | A1 * | 6/2021 | Beckford | B32B 15/085 |
| 2022/0112606 | A1 * | 4/2022 | Englert | C23C 22/73 |

FOREIGN PATENT DOCUMENTS

| | | | | |
|---|---|---|---|---|
| CA | 3112124 A1 * | 9/2022 | | C09D 7/61 |
| WO | WO-2014016239 A1 * | 1/2014 | | B01J 31/38 |

* cited by examiner

*Primary Examiner* — Anthony J Green

(74) *Attorney, Agent, or Firm* — William R. Childs; Childs Patent Law PLLC

(57) ABSTRACT

The present disclosure provides a paint composition, and methods of making and using the same, wherein the composition includes metal silicate particles, a binder, pigment particles, and a solvent. A benefit of the paint composition can be that it captures carbon dioxide from the air and excludes toxic or non-naturally occurring ingredients.

13 Claims, No Drawings

CARBON CAPTURE PAINT COMPOSITIONS AND METHODS OF MAKING AND USING THE SAME TO CAPTURE CARBON DIOXIDE FROM AIR

CROSS REFERENCE TO RELATED APPLICATIONS

This U.S. application claims priority to U.S. Provisional Application No. 63/432,991, filed Dec. 15, 2022, which is incorporated by reference in its entirety.

TECHNICAL FIELD

The present disclosure relates generally to the paint and carbon capture industries. Paint compositions, and methods of making and using the same, are disclosed herein, wherein the paint compositions can be used to capture or sequester carbon dioxide from the air.

BACKGROUND

Climate change due to global warming is considered by many to be an existential threat to human life and to be the greatest challenge of the modern era. Climate change is due to an increase in the greenhouse gases such as carbon dioxide and methane in the atmosphere, which absorb some of the heat that would normally be radiated from the earth into space after the sunlight has warmed the earth.

One of the main strategies for reducing carbon dioxide from the atmosphere is carbon capture and storage. Carbon capture and storage or carbon capture and sequestration basically has the strategy of finding various ways to capture carbon dioxide from the atmosphere and to store it in a form that removes it from the atmosphere for decades for millennia. industrial methods were largely blamed for emitting the carbon dioxide that is causing climate change, so the overall strategy is to develop industrial methods that remove carbon dioxide from the atmosphere to reverse or mitigate climate change.

One of the sources of carbon dioxide in the air is the use of conventional vinyl and acrylic-based materials that continuously emit a large amount of carbon dioxide along with other toxic materials in the air even for months and even years after their application onto a surface. Thus, traditional paints are unhealthy to people both for the toxic chemicals and carbon dioxide they emit into the atmosphere.

Carbon capture paint and coatings have been developed that limit or even absorb some amount of carbon dioxide from the environment. However, it has been found that these carbon dioxide absorbing paint compositions suffer from several limitations, including being environmentally unhealthy, toxic, and inefficient in capturing carbon dioxide from the air.

There is a need to develop paint compositions that can capture carbon dioxide from the air without presenting additional environmental threats. There is a need for carbon capture paints and coatings that use non-toxic ingredients.

BRIEF SUMMARY

The present disclosure provides paint compositions. In some embodiments, the paint composition comprises: from about 25.0 volume percent to about 45.0 volume percent of metal silicate particles, from about 4.0 volume percent to about 8.0 volume percent of a binder, wherein the binder comprises poly(3,4-dihydroxyphenylalanine), from about 15.0 volume percent to about 35.0 volume percent of pigment particles, and water, based on a total volume of the paint composition.

In some embodiments, the paint composition comprises about 30.0 volume percent to about 40.0 volume percent of the metal silicate particles. In some embodiments, the metal silicate particles include a magnesium silicate, an iron silicate, or a combination thereof. In some embodiments, the metal silicate particles include $(Mg)_2SO_4$, $(Fe)_2SO_4$, $(Mg_x, Fe_{1-x})_2SO_4$, a magnesium iron silicate, an olivine, or a combination thereof. In some embodiments, the metal silicate particles have a silicate size of from about 10 microns to about 30 microns. In some embodiments, the paint composition includes about 30.0 volume percent to about 40.0 volume percent of the metal silicate particles, wherein the metal silicate particles include $(Mg)_2SO_4$, $(Fe)_2SO_4$, $(Mg_x, Fe_{1-x})_2SO_4$, a magnesium iron silicate, an olivine, or a combination thereof, and the metal silicate particles have a silicate size of from about 10 microns to about 30 microns.

In some embodiments, the paint composition comprises from about 5.0 volume percent to about 7.0 volume percent of the binder. In some embodiments, the binder comprises poly(L-3,4-dihydroxyphenylalanine). In some embodiments, the paint composition comprises from about 5.0 volume percent to about 7.0 volume percent of the binder and the binder comprises poly(L-3,4-dihydroxyphenylalanine). In some embodiments, the binder comprises a molecule of Formula I:

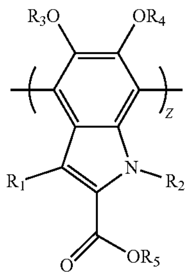

wherein $R_1$ is H or D,
wherein $R_2$ is H or D,
wherein $R_3$ is $H^+$, $D^+$, $Na^+$, $K^+$, or a negative charge,
wherein $R_4$ is $H^+$, $D^+$, $Na^+$, $K^+$, or a negative charge,
wherein $R_5$ is $H^+$, $D^+$, $Na^+$, $K^+$, or a negative charge, and
wherein Z is from about 10 to about 500.

In some embodiments, the paint composition comprises from about 20.0 volume percent to about 30.0 volume percent of the pigment particles. In some embodiments, the pigment particles have a pigment size of from about 20 microns to about 50 microns. In some embodiments, the paint composition comprises from about 20.0 volume percent to about 30.0 volume percent of the pigment particles, and wherein the pigment particles have a pigment size of about 20 microns to about 50 microns. In some embodiments, the pigment particles comprise one or more pigments. In some embodiments, the one or more pigments include a natural pigment, an inorganic pigment, an organic pigment, a non-toxic pigment, a solid pigment, a water insoluble pigment, or any combination or mixture thereof. In some embodiments, the paint composition comprises from about 12.0 volume percent to about 56.0 volume percent water. In some embodiments, the paint composition comprises from about 20.0 volume percent to about 46.0 volume percent water. In some embodiments, the paint composition comprises a volume-to-volume ratio of the metal silicate particles to the binder ranging from about 3.1:1 to about 11.3:1. In some embodiments, the paint composition comprises a volume-to-volume ratio of the metal silicate particles to the pigment particles ranging from about 0.7:1 to about 3.0:1. In some embodiments, the paint composition comprises: from about 30.0 volume percent to about 40.0 volume percent of the metal silicate particles, wherein the metal silicate particles are selected from the group consisting of $(Mg)_2SO_4$, $(Fe)_2SO_4$, $(Mg_x, Fe_{1-x})_2SO_4$, a magnesium iron silicate, an olivine, or a combination thereof, and the metal silicate particles have a silicate size of from about 10 microns to about 55 microns; and from about 5.0 volume percent to about 7.0 volume percent of a binder, wherein the binder comprises poly(3,4-dihydroxyphenylalanine); from about 20.0 volume percent to about 30.0 volume percent of pigment particles, wherein the pigment particles have a pigment size of about 20 microns to about 50 microns; and from about 23.0 volume percent to about 46.0 volume percent water, based on the total volume of the paint composition.

The present disclosure provides methods of capturing carbon dioxide in paint compositions. In some embodiments, the method of capturing carbon dioxide in a paint composition comprises: providing a paint composition, wherein the paint composition includes from about 25.0 volume percent to about 45.0 volume percent of metal silicate particles, and from about 4.0 volume percent to about 8.0 volume percent of a binder, wherein the binder comprises poly(3,4-dihydroxyphenylalanine), from about 15.0 volume percent to about 35.0 volume percent of pigment particles, and water, based on a total volume of the paint composition; forming a paint composition on a surface by applying the paint composition to the surface; and exposing the paint composition on the surface to ambient air for a carbon capture duration.

In some embodiments, the method further comprises binding from about 0.6 to about 1.0 grams of carbon dioxide per 1.0 gram of metal silicate particles in the paint composition. In some embodiments, the carbon capture duration is from about 1 hour to about 2 years. In some embodiments, the carbon capture duration is from 2 years to 6 years. In some embodiments, the method further comprising, providing a second paint composition, wherein the second paint composition includes from about 25.0 volume percent to about 45.0 volume percent of second metal silicate particles, from about 4.0 volume percent to about 8.0 volume percent of a second binder, wherein the second binder comprises poly(3,4-dihydroxyphenylalanine), from about 15.0 volume percent to about 35.0 volume percent of second pigment particles, and a second volume of water, and binding an additional from about 0.6 to about 1.0 grams of carbon dioxide per 1.0 gram of second metal silicate particles in a second paint composition by forming a second paint composition on the paint composition on the surface by applying the second paint composition to a surface of the paint composition on the surface; and exposing the second paint composition on the surface to ambient air for a carbon capture duration of 2 years.

The present disclosure provides methods of manufacturing paint compositions. In some embodiments, the method of manufacturing the paint composition comprises: providing water, forming a binder solution by adding a binder volume of a binder to the water, and forming the paint composition by adding a pigment volume of pigment particles and a silicate volume of metal silicate particles to the binder solution, wherein the paint composition includes from about 25.0 volume percent to about 45.0 volume percent of the metal silicate particles, from about 4.0 volume percent to about 8.0 volume percent of the binder, wherein the binder comprises poly(3,4-dihydroxyphenylalanine), from about 15.0 volume percent to about 35.0 volume percent of the pigment particles, and a water volume of water.

In some embodiments, the pigment particles can be added to the binder solution before the metal silicate particles. In some embodiments, the metal silicate particles can be added to the binder solution before the pigment particles. In some embodiments, the pigment particles and the metal silicate particles can be added simultaneously to the binder solution. In some embodiments, the method further comprising: before forming a binder solution by adding a binder volume of a binder to the water, forming the binder by polymerizing 3,4-dihydroxyphenylalanine in a polymerizing solution having a pH of about 4.0 to about 5.0.

DETAILED DESCRIPTION

Unless otherwise noted, all measurements are in standard metric units.

Unless otherwise noted, all instances of the words "a," "an," or "the" can refer to one or more than one of the word that they modify.

Unless otherwise noted, the phrase "at least one of" means one or more than one of an object. For example, "at least one of a natural pigment, an inorganic pigment . . . or any combination or mixture thereof," means a single natural pigment, two or more natural pigments, a single inorganic pigment, two or more inorganic pigments, or any combination thereof.

Unless otherwise noted, the term "about" refers to ±10.0% of the non-percentage number that is described, rounded to the nearest number to the accuracy shown. For example, about 105.3 mm, would include 94.8 to 115.8 mm. Unless otherwise noted, the term "about" refers to ±5% of a percentage number. For example, about 20% would include 15 to 25%. When the term "about" is discussed in terms of a range, then the term refers to the appropriate amount less than the lower limit and more than the upper limit. For example, from about 100 to about 200 mm would include from 90 to 220 mm.

Unless otherwise noted, a range of numbers includes all numbers in that range. For example, the range of 25.0 volume percent to about 45.0 volume percent includes 26, 28, 30, 35, 38, 40, 42 and any sub range/number therein.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Unless otherwise noted, the term "particle size" as used herein throughout the present disclosure denotes the longest measured dimension of the particle.

Unless otherwise noted, the term "for example" or "e.g.," as used herein, is used merely by way of example, without limitation intended, and should not be construed as referring only those items explicitly described in the specification.

Unless otherwise noted, properties (height, width, length, ratio etc.), and especially "particle size," as described herein are understood to be averaged measurements.

Conventional paint compositions, and methods of manufacturing and using the same, suffer from several limitations, including being environmentally toxic and emitting carbon dioxide. Conventional carbon capture paint compositions, and methods of manufacturing and using the same, suffer from several limitations, including being environmentally toxic and having low carbon dioxide capture efficiency.

The present disclosure provides paint coatings, and methods of making and using the same, that are capable of efficiently capturing carbon dioxide from the air. The present disclosure provides paint coatings, and methods of making and using the same, that are capable of efficiently capturing carbon dioxide from the air without including toxic ingredients or even excluding toxic ingredients. The present disclosure provides paint coatings which include a pigment, a binder, a solvent, and possibly other additives.

Olivine is a family of natural magnesium and iron silicates that is known to capture carbon dioxide. For example, olivine has been used as a mineral to be mixed with sand for beaches to provide a beach front, where the sand-olivine mixture absorbs carbon dioxide over the course of years. However, those sand-olivine mixture used olivine having a 60-micron particle size or greater to avoid having the olivine get carried away by wind or water or, worse, accidentally inhaled by people or animals. For example, if the olivine were accidently inhaled by a person, then it can lead to health risks similar to cigarette smoke or coal dust by allowing microparticles to accumulate in the lungs. Similarly, people have used olivine in soil so that the olivine-soil mixture would absorb carbon dioxide. Once again, the olivine used had a particle size that was 90 microns or greater to avoid having the olivine get carried away by wind or water or accidentally being inhaled by people or animals.

The use of olivine particles having a size of 60 microns or more would seem to be a workable solution. However, the larger the olivine particle size, then the slower the carbon dioxide absorption rate. Conversely, the smaller the olivine particle size, the faster the carbon dioxide absorption rate, but the greater the health risk. Therefore, standard strategies have focused on using olivine particles of 60 microns or greater to optimize the benefits of faster carbon dioxide absorption while avoiding the health risks of accidental inhalation.

It has been discovered that it is possible to make a paint composition that safely includes metal silicate particles, such as olivine, having particle sizes of less than 60 microns, including from 10 to 30 microns, while efficiently capture carbon dioxide. Further, it has been discovered that the use of a specific binders in specific percentages, as described herein, can safely bind the metal silicate particles in the paint composition while providing a coating that is breathable enough to allow for carbon dioxide to pass into the paint and to be captured (absorbed or absorbed) by the metal silicate particles. A benefit of the presently disclosed paint compositions can be the capture of carbon dioxide on a near weight-by-weight basis. For example, 1 gram of metal silicates in the paint compositions can capture from 0.6 to 1.0 grams of carbon dioxide from the air over the course of months to 2 years. In contrast, the olivine containing beaches and soil, discussed above, were forced to use larger particle sizes (60 microns or greater) that could only capture significant amounts of carbon dioxide over the course of five to ten years and often at lower efficiencies because surrounding sand and soil block much of the surface area of the olivine particles.

Unfortunately, even such spectacular results are not sufficient to foster widespread use of a paint unless the paint is commercially viable as a paint product. The commercial viability of any paint composition is typically based on its color, cost, texture (coat-ability), and durability. Also, metal silicates, such as olivine, typically have naturally unpleasant colors, such as green, that interfere with the desired color of a paint. Moreover, it was found that many binders tended to discolor upon curing, such that the resulting paint coating was discolored. It has been discovered that the inclusion of L-dopa, or related compounds, in specific percentages, as disclosed herein, provide a binder that is breathable enough to allow for metal silicates in the paint composition to capture carbon dioxide while avoid discoloring.

It has been discovered their paint compositions can be provided which efficiently captures carbon dioxide while providing great designable colors using a variety of pigments, while reducing or even excluding all toxic ingredients to provide an amazingly environmentally friendly aqueous paint composition.

The present disclosure provides a paint composition. In some embodiments, the paint composition comprises from about 25.0 volume percent to about 45.0 volume percent of metal silicate particles and solvent, based on a total volume of the paint composition. In some embodiments, the paint composition comprises from about 4.0 volume percent to about 8.0 volume percent of a binder and solvent, based on a total volume of the paint composition. In some embodiments, the binder comprises poly(3,4-dihydroxyphenylalanine). In some embodiments, the paint composition comprises from about 15.0 volume percent to about 35.0 volume percent of pigment particles and solvent, based on a total volume of the paint composition. In some embodiments, the paint composition comprises from about 25.0 volume percent to about 45.0 volume percent of metal silicate particles, and about 4.0 volume percent to about 8.0 volume percent of a binder, and solvent, based on a total volume of the paint composition. In some embodiments, the solvent includes water. In some embodiments, the solvent is water.

In some embodiments, the paint composition comprises from about 25.0 volume percent to about 45.0 volume percent of metal silicate particles, based on a total volume of the paint composition. In some embodiments, the paint composition comprises about 30.0 volume percent to about 40.0 volume percent of the metal silicate particles. A benefit of including metal silicate particles can be that the metal silicate particles are the components of the paint composition that bind or sequester carbon dioxide. If the volume percent of metal silicate particles passes below 30%, then the composition loses too much of its carbon capture ability to be a viable carbon capture strategy. If the volume percent of metal silicate particles goes above 40%, then the texture of the paint composition becomes impermissibly gritty, resulting in loss of coating ability on surfaces. In some embodiments, the metal silicate particles include a magnesium silicate, an iron silicate, or a combination thereof. In some embodiments, the metal silicate particles include $(Mg)_2SO_4$, $(Fe)_2SO_4$, $(Mg_x, Fe_{1-x})_2SO_4$, magnesium iron silicate, olivine, or a combination thereof. In some embodiments, the metal silicate particles have an average silicate size of from about 10 microns to about 30 microns. A benefit of the size of the metal silicate particles can be that smaller sizes bind carbon dioxide more quickly and provide better textures for the paint composition, but smaller sizes can lead to safety concerns during manufacturing. If these average size of the metal silicate particles passes above 30 microns in size, then the paint composition becomes impermissibly gritty, resulting in loss of coating ability on surfaces. If the average size of the metal silicate particles passes below 10 microns in size, then the paint composition becomes impermissibly dangerous during manufacturing. In some embodiments, the paint composition includes about 30.0 volume percent to about 40.0 volume percent of the metal silicate particles, wherein the metal silicate particles include $(Mg)_2SO_4$, $(Fe)_2SO_4$, $(Mg_x, Fe_{1-x})_2SO_4$, a magnesium iron silicate, an olivine, or a combination thereof, and the metal silicate particles have an average silicate size of from about 10 microns to about 30 microns.

In an embodiment, the paint composition comprises about 25.0 volume percent to about 45.0 volume percent of the metal silicate particles, preferably, from about 30.0 volume percent to about 40.0 volume percent of the metal silicate particles. One benefit of having an amount of metal silicate particles in a volume percent equal to or less than about 45.0 volume percent of the metal silicate particles based on the total volume of the paint composition can be reducing or eliminating problems of deterioration of the texture of the paint from the surface. One benefit of having an amount of metal silicate particles in a volume percent equal to or more than about 25.0 volume percent of the metal silicate particles based on the total volume of the paint composition can be the retention of the carbon dioxide capturing capability of the paint composition, allowing efficient capturing of carbon dioxide in the paint composition.

In some embodiments, the paint composition comprises from about 4.0 volume percent to about 8.0 volume percent of the binder. In some embodiments, the paint composition comprises from about 5.0 volume percent to about 7.0 volume percent of the binder. In the context of a "binder" for the paint composition, the term "about" means ±0.2% v/v. One benefit of having an amount of binder in a volume percent equal to or less than about 8.0 volume percent of the binder based on the total volume of the paint composition can be the retention of desired viscosity of the paint composition, allowing the metal silicate particles in the paint composition to "breath" or be permeable to carbon dioxide, which allows for the efficient capture of carbon dioxide in a paint composition. One benefit of having an amount of binder in a volume percent equal to or more than about 4.0 volume percent of the binder based on the total volume of the paint composition can be preventing the paint composition from becoming too thin to form a consistent paint coating on the surface.

In some embodiments, the binder can include a low molecular mass (number average of molecular mass "Mn" being within the range of about 500 to about 3000) ketone-aldehyde, ketone and/or aldehyde resin soluble in all major paint solvents including water, aliphatic and aromatic hydrocarbons (white spirits and isoparaffins) and the like. The softening points of resins of such type are normally 65 to 90° C. The following commercially available products amongst others can be mentioned as suitable binders, including, but not limited to, a ketone formaldehyde resin (softening point of approximately 70° C.) produced by Hüls AG; Laropal® K 80, a polycondensation product of cyclohexanone (softening point of 75 to 85° C.) produced by BASF AG; and Laropal® A 81, an aldehyde resin based on urea and aliphatic aldehydes (softening point 80-90° C.) produced by BASF AG. These resins are delivered as pellets soluble in water, hydrocarbons, alcohols, esters, ketones, glycol ethers, etc.

In some embodiments, the binder comprises poly(L-3,4-dihydroxyphenylalanine). In some embodiments, the binder is poly(L-3,4-dihydroxyphenylalanine). In some embodiments, the paint composition includes from about 50 volume percent to about 100 volume percent poly(L-3,4-dihydroxyphenylalanine) based on the total volume of the binder in the paint composition. In some embodiments, the paint composition comprises from about 5.0 volume percent to about 7.0 volume percent of the binder and the binder comprises poly(L-3,4-dihydroxyphenylalanine). In some embodiments, the binder comprises a molecule of Formula I:

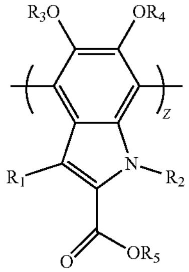

wherein $R_1$ is H or D,
wherein $R_2$ is H or D,
wherein $R_3$ is $H^+$, $D^+$, $Na^+$, $K^+$, or a negative charge,
wherein $R_4$ is $H^+$, $D^+$, $Na^+$, $K^+$, or a negative charge,
wherein $R_5$ is $H^+$, $D^+$, $Na^+$, $K^+$, or a negative charge, and
wherein Z is from about 10 to about 500.

Without wishing to be bound by theory, it is believed that the use of L or D isomer 3,4-dihydroxyphenylalanine does not affect the properties of the polymerized binder, but L-3,4-dihydroxyphenylalanine is a natural isomer and amino acid. therefore, L-3,4-dihydroxyphenylalanine or "levodopa" can be preferred on the basis of lower costs and the presumption that natural ingredients are safer for the environment.

It has been found that when many binders are cured, they tend to cure with a visible brown color, which can interfere with the color of the paint composition when applied to a surface. However, it has been discovered that when molecules of Formula I, particularly, poly(L-3,4-dihydroxyphenylalanine), are cured in the presence of a buffer and an acid, the resulting binder does is clear or has reduced color or no color relative to other binders tested.

In some embodiments, the paint composition comprises from about 15.0 volume percent to about 35.0 volume percent of the pigment particles. In some embodiments, the paint composition comprises from about 20.0 volume percent to about 30.0 volume percent of the pigment particles. In some embodiments, the pigment particles have a pigment size of from about 20 microns to about 50 microns. In some embodiments, the paint composition comprises from about 20.0 volume percent to about 30.0 volume percent of the pigment particles, and wherein the pigment particles have a pigment size of about 20 microns to about 50 microns.

One benefit of having an amount of pigment particles in a volume percent of equal to or less than about 35.0 volume percent of the pigment particles based on the total volume of the paint composition can be providing a desired color to the paint composition without affecting or lowering the volume percent of the other important components, such as metal silicates particles that have the function of capturing carbon dioxide in the paint composition. One benefit of having an amount of pigment particles having a volume percent of equal to or more than about 15.0 volume percent of the pigment particles based on the total volume of the paint composition can be providing a color (color that is produced due to the presence of pigment particles) to the paint composition by dominating or masking the natural color of a metal silicate particles. One benefit of having pigment particles having a size of from about 20 microns to about 50 microns can be reducing or eliminating problems of development of undesirable texture of the paint composition, making the paint looking poor on the surface of a wall or an article and the like.

In some embodiments, the pigment particles comprise one or more pigments. In some embodiments, the one or more pigments include a natural pigment, an inorganic pigment, an organic pigment, a non-toxic pigment, a solid pigment, a water insoluble pigment, or any combination or mixture thereof. In an embodiment, the pigment particles include but are not limited to Flavanthrone, Monoazo, Diarylide, Anthrapyrimidine, Isoindolinone, Benzimidazolone, Disazo condensation, Quinophthalone, Isoindoline, Bisacetoacetarylide, Perinone, Pyranthrone, Pyrazoloquinazolone, Thioindigo, Naphthol AS, Quinacridone, Perylene, Anthantrone, Anthraquinone, Diketo pyrrolo pyrrole, Dioxazine, Phthalocyanine α-mod., Phthalocyanine β-mod., Phthalocyanine ε-mod., Metal-free phthalocyanine, Indanthrone, Phthalocyanine, Aniline, Iron oxide, Nickel rutile, Bismuth vanadate, Ultramarine, Iron Blue, Cobalt, Chromium oxide, Umbra, Chrome rutile, Lamp Black, Carbon Black, Spinel Black, Iron copper, Chrome oxide, or combinations thereof.

In some embodiments, the paint composition comprises from about 12.0 volume percent to about 56.0 volume percent water. In some embodiments, the paint composition comprises from about 20.0 volume percent to about 46.0 volume percent water. One benefit of having an amount of water in a volume percent of equal to or less than about 56.0 volume percent of the water based on the total volume of the paint composition can be providing desired viscosity to the paint composition without affecting or lowering the volume percent of the other functional components, such as metal silicates particles, that function to capture carbon dioxide in the paint composition. One benefit of having an amount of water in a volume percent of equal to or more than about 12.0 volume percent of the water based on the total volume of the paint composition can be providing desired texture to the paint composition or paint on the surface of a wall, an article, and the like.

In some embodiments, one or more solvents, other than water, can be used in the paint composition of the present disclosure. In an embodiment, the solvent includes but is not limited to methanol, ethanol, propanols, butanols, esters of lactic acid, such as esters of 2-hydroxypropane acid, and alcohols, like methanol, ethanol, propanols or butanols of the following general formula: $CH_3$—CH(OH)—CO—OR (lactate), wherein R═$C_1$-$C_4$-alkyl and combinations thereof. In some embodiments, the solvent is ethyl or isopropyl lactate with relative volatilities of 22 and 18, respectively. In some embodiments, the solvent is mixed with water. In some embodiments, the solvent comprises from about 50 to 100% water, including from 80 to 100% water, including from 90 to 100%, including from 90% to 99%, water based on the total volume of solvent. In some embodiments, the solvent comprises a mixture of ethanol, water, and acetone. In some embodiments, the solvent comprises a mixture of ethanol and water.

In some embodiments, the paint composition comprises a volume-to-volume ratio of the metal silicate particles to the binder ranging from about 3.1:1 to about 11.3:1. In some embodiments, the paint composition comprises a volume-to-volume ratio of the metal silicate particles to the binder from about 3.5:1 to about 11.0:1, including from about 4.0:1 to about 10.5:1, from about 4.0:1 to about 10.0:1 or from about 4.5:1 to about 9.5:1. One benefit of having volume-to-volume ratio of the metal silicate particles to the binder in the paint composition in the range from about 3.1:1 to about 11.3:1 can be retention of desired viscosity of the paint composition to form a paint coating on the surface without compromising with the ability of the metal silicate particles to efficiently capture the carbon dioxide in a paint composition from the air.

In some embodiments, the paint composition comprises a volume-to-volume ratio of the metal silicate particles to the pigment particles ranging from about 0.7:1 to about 3.0:1. In some embodiments, the paint composition comprises a volume-to-volume ratio of the metal silicate particles to the pigment particles from about 0.8:1 to about 2.9:1, including from about 0.9:1 to about 2.8:1, from about 1.0:1 to about 2.6.0:1 or from about 1.2:1 to about 2.5:1. One benefit of having the volume-to-volume ratio of the metal silicate particles to the pigment particles in the paint composition in the range from about 0.7:1 to about 3.0:1 can be providing the desired color to the paint composition or paint on the surface of a wall, an article and the like without affecting or lowering the concentration of an important component like metal silicates particles that play an important role in efficient capturing of the carbon dioxide in the paint composition.

In some embodiments, the paint composition comprises: from about 30.0 volume percent to about 40.0 volume percent of the metal silicate particles, wherein the metal silicate particles are selected from the group consisting of $(Mg)_2SO_4$, $(Fe)_2SO_4$, $(Mg_x, Fe_{1-x})_2SO_4$, a magnesium iron silicate, an olivine, or a combination thereof, and the metal silicate particles have a silicate size of from about 10 microns to about 55 microns; and from about 5.0 volume percent to about 7.0 volume percent of a binder, wherein the binder comprises poly(3,4-dihydroxyphenylalanine); from about 20.0 volume percent to about 30.0 volume percent of pigment particles, wherein the pigment particles have a pigment size of about 20 microns to about 50 microns; and from about 23.0 volume percent to about 46.0 volume percent water, based on the total volume of the paint composition.

The present disclosure provides a method of capturing carbon dioxide in a paint composition. In some embodiments, the method of capturing carbon dioxide in a paint composition comprises: providing a paint composition, wherein the paint composition includes from about 25.0 volume percent to about 45.0 volume percent of metal silicate particles, or from about 4.0 volume percent to about 8.0 volume percent of a binder, or from about 15.0 volume percent to about 35.0 volume percent of pigment particles, or mixtures thereof in a solvent, based on a total volume of the paint composition. In some embodiments, the method of capturing carbon dioxide in a paint composition comprises forming a paint composition on a surface by applying the paint composition to the surface. In some embodiments, the method of capturing carbon dioxide in a paint composition comprises exposing the paint composition on the surface to ambient air for a carbon capture duration. In some embodiments of the method, the method includes providing a paint composition, wherein the paint composition includes from about 25.0 volume percent to about 45.0 volume percent of metal silicate particles; or from about 4.0 volume percent to about 8.0 volume percent of a binder, wherein the binder comprises poly(3,4-dihydroxyphenylalanine); or from about 15.0 volume percent to about 35.0 volume percent of pigment particles; or mixtures thereof in a solvent, based on a total volume of the paint composition. In some embodiments, the solvent is water.

In some embodiments, the method further comprises binding from about 0.6 to about 1.0 grams of carbon dioxide per 1.0 gram of metal silicate particles in the paint composition. In some embodiments, the carbon capture duration is from about 1 hour to about 2 years. In some embodiments, the carbon capture duration is from 2 years to 6 years. In some embodiments, the carbon capture duration is from about 1 hour to about 6 years, including from about 5 hour to about 5.5 years, from about 15 hour to about 5 years, from about 24 hour to about 4 years, from about 2 days to about 6 years, from about 2 days to about 5 years, from about 15 days to about 3 years, from about 1 month to about 5 years, from about 1 month to about 4 years, from about 5 month to about 3 years, or from about 1 year to about 2.5 years.

In some embodiments, the method of capturing carbon dioxide in a paint composition comprises applying a second or third coating of the same or a different paint composition, as disclosed herein, after an intermediate duration to a surface, to capture a second amount of carbon dioxide from the environment into a second layer of paint. In more detail, in some embodiments, the method further comprises: providing a second paint composition, wherein the second paint composition includes from about 25.0 volume percent to about 45.0 volume percent of second metal silicate particles, from about 4.0 volume percent to about 8.0 volume percent of a second binder, wherein the second binder comprises poly(3,4-dihydroxyphenylalanine), from about 15.0 volume percent to about 35.0 volume percent of second pigment particles, and a second volume of water, and binding an additional from about 0.6 to about 1.0 grams of carbon dioxide per 1.0 gram of second metal silicate particles in a second paint composition by forming a second paint composition on the paint composition on the surface by applying the second paint composition to a surface of the paint composition on the surface; and exposing the second paint composition on the surface to ambient air for a carbon capture duration of 2 years.

The present disclosure provides a method of manufacturing a paint composition. In some embodiments, the method of manufacturing the paint composition comprises: providing a solvent, forming a binder solution by adding a binder volume of a binder to the solvent, and forming the paint composition by adding a pigment volume of pigment particles and a silicate volume of metal silicate particles to the binder solution, wherein the paint composition includes from about 25.0 volume percent to about 45.0 volume percent of the metal silicate particles, from about 4.0 volume percent to about 8.0 volume percent of the binder from about 15.0 volume percent to about 35.0 volume percent of the pigment particles, and a solvent volume of solvent. In some embodiments of the method of manufacturing a paint composition, the binder comprises poly(3,4-dihydroxyphenylalanine) or a compound of Formula I.

In some embodiments, the solvent is water, wherein the method of manufacturing the paint composition comprises: providing water, forming a binder solution by adding a binder volume of a binder to water, and forming the paint composition by adding a pigment volume of pigment particles and a silicate volume of metal silicate particles to the binder solution, wherein the paint composition includes from about 25.0 volume percent to about 45.0 volume percent of the metal silicate particles, from about 4.0 volume percent to about 8.0 volume percent of the binder, wherein the binder comprises poly(3,4-dihydroxyphenylalanine), from about 15.0 volume percent to about 35.0 volume percent of the pigment particles, and a water volume of water.

In some embodiments, the pigment particles can be added to the binder solution before the metal silicate particles. In some embodiments, the metal silicate particles can be added to the binder solution before the pigment particles. In some embodiments, the pigment particles and the metal silicate particles can be added simultaneously to the binder solution. In some embodiments, the method further comprising: before forming a binder solution by adding a binder volume of a binder to the water, forming the binder by polymerizing 3,4-dihydroxyphenylalanine in a polymerizing solution having a pH of about 4.0 to about 5.0.

In some embodiments, the buffer includes but is not limited to tris(hydroxymethyl)methylamino]propanesulfonic acid) (Taps), 2-(bis(2-hydroxyethyl)amino)acetic acid (Bicine), tris(hydroxymethyl)aminomethane, or 2-amino-2-(hydroxymethyl)propane-1,3-diol (Tris), N-[tris(hydroxymethyl)methyl]glycine (Tricine), 3-[N-tris(hydroxymethyl) methylamino]-2-hydroxypropanesulfonic acid (Tapso) and combinations thereof.

In some embodiments, the acid includes but is not limited to formic acid, acetic acid, monochloro acetic acid, propionic acid, butyric acid, isobutyric acid, citric acid, lactic acid, adipic acid, succinic acid, hydroxy acetic acid, glycolic acid, mandelic acid, p-toluene sulfonic acid, acrylic acid, and combinations thereof. In an embodiment, the acid includes or is citric acid.

One of the benefits of the presently disclosed paint composition can be the purity, simplicity, non-toxicity, and/or harmless nature of the ingredients. In some embodiments, the paint composition consists of metal silicate particles, a binder, and pigment particles, water, and less than 5.0% by volume of an impurity, based on a total volume of the paint composition, wherein the impurity is any substance other than the metal silicate particles, the binder, and the pigment particles, and the water. In some embodiments, the paint composition comprises less than 5.0% by volume of an impurity, based on a total volume of the paint composition, wherein the impurity is any substance that is not found in nature. In some embodiments, the paint composition comprises less than 5.0% by volume of an impurity, based on a total volume of the paint composition, wherein the impurity is toxic (Lethal dose 50 of less than or equal to 1,000 mg/kg). In some embodiments, the paint composition comprises less than 5.0% by volume of an impurity, based on a total volume of the paint composition, wherein the impurity is toxic (Lethal dose 50 of less than or equal to 500 mg/kg). In some embodiments, the paint composition comprises less than 5.0% by volume of an organic solvent, based on a total volume of the paint composition.

EXAMPLES

Example 1 (Baseline Recipes which are Scaled Up for 1 Gal Paint (10 Lbs. Paint Total/Gal; 1,198 kg/$m^3$)

2 mg L-dopamine per milliliter 10 mM tris buffer (6% binder/total) or citric acid
40% olivine
20% pigment
34% solvent (DI $H_2O$)

2 mg dopamine per milliliter 10 mM tris buffer is continuously stirred in DI $H_2O$ at ambient conditions for 4 hours. Simultaneously, olivine and pigment are mixed in solvent continuously. 6% binder solution is added to olivine/pigment mixture and final solution is mixed for 12 hours.

Example 2

2 mg L-dopa per milliliter 10 mM tris buffer or citric acid (6% total) is continuously stirred in 10 mL DI $H_2O$/mL olivine for 4 hours. Subsequently, pigment powder is added and continuously stirred for 12 hr.

What is claimed is:

1. A paint composition comprising:

from about 25.0 volume percent to about 45.0 volume percent of metal silicate particles, and from about 4.0 volume percent to about 8.0 volume percent of a binder, wherein the binder comprises poly(3,4-dihydroxyphenylalanine), from about 15.0 volume percent to about 35.0 volume percent of pigment particles, and water, based on a total volume of the paint composition.

2. The paint composition of claim 1, wherein the paint composition comprises about 30.0 volume percent to about 40.0 volume percent of the metal silicate particles; or wherein the metal silicate particles include a magnesium silicate, an iron silicate, or a combination thereof; or wherein the metal silicate particles include $(Mg)_2SO_4$, $(Fe)_2SO_4$, $(Mg_x, Fe_{1-x})_2SO_4$, a magnesium iron silicate, an olivine, or a combination thereof; or wherein the metal silicate particles have a silicate size of from about 10 microns to about 30 microns; or wherein the paint composition includes about 30.0 volume percent to about 40.0 volume percent of the metal silicate particles, wherein the metal silicate particles include $(Mg)_2SO_4$, $(Fe)_2SO_4$, $(Mg_x, Fe_{1-x})_2SO_4$, a magnesium iron silicate, an olivine, or a combination thereof, and the metal silicate particles have a silicate size of from about 10 microns to about 30 microns.

3. The paint composition of claim 1, wherein the paint composition comprises from about 5.0 volume percent to about 7.0 volume percent of the binder; or wherein the binder comprises poly(L-3,4-dihydroxyphenylalanine); or wherein the paint composition comprises from about 5.0 volume percent to about 7.0 volume percent of the binder and the binder comprises poly(L-3,4-dihydroxyphenylalanine); or wherein the binder comprises a molecule of Formula I:

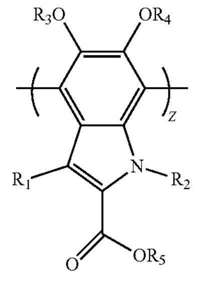

wherein $R_1$ is H or D, wherein $R_2$ is H or D, wherein $R_3$ is $H^+$, $D^+$, $Na^+$, $K^+$, or a negative charge, wherein $R_4$ is $H^+$, $D^+$, $Na^+$, $K^+$, or a negative charge, wherein $R_5$ is $H^+$, $D^+$, $Na^+$, $K^+$, or a negative charge, and wherein Z is from about 10 to about 500.

4. The paint composition of claim 1, wherein the paint composition comprises from about 20.0 volume percent to about 30.0 volume percent of the pigment particles; or wherein the pigment particles have a pigment size of from about 20 microns to about 50 microns; or wherein the paint composition comprises from about 20.0 volume percent to about 30.0 volume percent of the pigment particles, and wherein the pigment particles have a pigment size of about 20 microns to about 50 microns; or wherein the pigment particles comprise one or more pigments, wherein the one or more pigments include a natural pigment, an inorganic pigment, an organic pigment, a non-toxic pigment, a solid pigment, a water insoluble pigment, or any combination or mixture thereof, or wherein the paint composition comprises from about 12.0 volume percent to about 56.0 volume percent water; or wherein the paint composition comprises from about 20.0 volume percent to about 46.0 volume percent water.

5. The paint composition of claim 1, wherein a volume-to-volume ratio of the metal silicate particles to the binder is from about 3.1:1 to about 11.3:1; or wherein a volume-to-volume ratio of the metal silicate particles to the pigment particles is from about 0.7:1 to about 3.0:1.

6. The paint composition of claim 1, comprising:

from about 30.0 volume percent to about 40.0 volume percent of the metal silicate particles, wherein the metal silicate particles are selected from the group consisting of $(Mg)_2SO_4$, $(Fe)_2SO_4$, $(Mg_x, Fe_{1-x})_2SO_4$, a magnesium iron silicate, an olivine, or a combination thereof, and the metal silicate particles have a silicate size of from about 10 microns to about 55 microns; and from about 5.0 volume percent to about 7.0 volume percent of a binder, wherein the binder comprises poly(3,4-dihydroxyphenylalanine);

from about 20.0 volume percent to about 30.0 volume percent of pigment particles, wherein the pigment particles have a pigment size of about 20 microns to about 50 microns; and from about 23.0 volume percent to about 46.0 volume percent water, based on the total volume of the paint composition.

7. A method of capturing carbon dioxide in a paint composition, comprising:

providing a paint composition, wherein the paint composition includes from about 25.0 volume percent to about 45.0 volume percent of metal silicate particles, and from about 4.0 volume percent to about 8.0 volume percent of a binder, wherein the binder comprises poly(3,4-dihydroxyphenylalanine), from about 15.0 volume percent to about 35.0 volume percent of pigment particles, and water, based on a total volume of the paint composition;

forming a paint composition on a surface by applying the paint composition to the surface; and exposing the paint composition on the surface to ambient air for a carbon capture duration.

8. The method of claim 7, wherein the carbon capture duration is from about 1 hour to about 2 years.

9. The method of claim 7, further comprising binding from about 0.6 to about 1.0 grams of carbon dioxide per 1.0 gram of metal silicate particles in the paint composition, wherein the carbon capture duration is from 2 years to 6 years.

10. The method of claim 9, further comprising, providing a second paint composition, wherein the second paint composition includes from about 25.0 volume percent to about 45.0 volume percent of second metal silicate particles, from about 4.0 volume percent to about 8.0 volume percent of a second binder, wherein the second binder comprises poly(3,4-dihydroxyphenylalanine), from about 15.0 volume percent to about 35.0 volume percent of second pigment particles, and a second volume of water, and binding an additional from about 0.6 to about 1.0 grams of carbon dioxide per 1.0 gram of second metal silicate particles in a second paint composition by forming a second paint composition on the paint composition on the surface by applying the second paint composition to a surface of the paint composition on the surface; and exposing the second paint composition on the surface to ambient air for a carbon capture duration of 2 years.

11. A method of manufacturing a paint composition comprising:

providing water, forming a binder solution by adding a binder volume of a binder to the water, and forming the paint composition by adding a pigment volume of pigment particles and a silicate volume of metal silicate particles to the binder solution, wherein the paint composition includes from about 25.0 volume percent to about 45.0 volume percent of the metal silicate particles, from about 4.0 volume percent to about 8.0 volume percent of the binder, wherein the binder comprises poly(3,4-dihydroxyphenylalanine), from about 15.0 volume percent to about 35.0 volume percent of the pigment particles, and a water volume of water.

12. The method of claim 11, wherein the pigment particles can be added to the binder solution before the metal silicate particles, or the metal silicate particles can be added to the binder solution before the pigment particles, or the pigment particles and the metal silicate particles can be added simultaneously to the binder solution.

13. The method of claim 11, further comprising:

before forming a binder solution by adding a binder volume of a binder to the water, forming the binder by polymerizing 3,4-dihydroxyphenylalanine in a polymerizing solution having a pH of about 4.0 to about 5.0.

* * * * *